UNITED STATES PATENT OFFICE.

CHRISTOPHER C. F. BRANDT, OF MUSCATINE, IOWA.

PROCESS OF ENAMELING PHOTOGRAPHS AND OTHER PRINTS.

SPECIFICATION forming part of Letters Patent No. 444,084, dated January 6, 1891.

Application filed March 13, 1890. Serial No. 343,753. (No specimens.)

*To all whom it may concern:*

Be it known that I, CHRISTOPHER C. F. BRANDT, a citizen of the United States, residing at Muscatine, in the county of Muscatine and State of Iowa, have invented certain new and useful Improvements in Processes of Enameling Photographs and other Prints; and I do declare the following to be a full, clear, and exact description of the invention, such as will enable others skilled in the art to which it appertains to make and use the same.

This invention relates to certain new and useful improvements in the method of enameling photographs and other prints in which the article to be enameled is covered with a transparent covering that presents a glossy appearance and that may be wiped with a wet cloth, and that will not crack when exposed to the heat or cold, and which consists of the hereinafter-described compositions.

In carrying my invention into use I proceed as follows: I take a piece of clear window-glass free from air-bubbles and apply with a cotton-flannel rag to one side thereof a mixture of talc and alcohol in about equal proportions and rub dry for the purpose of releasing the enameled work from the glass when dry. I then flow the prepared side of the glass with a solution of the following ingredients in about the following proportions: celloidine, one hundred grains; ether, ten grains; alcohol, six ounces, the room at a temperature of from 60° to 110° Fahrenheit. To this solution may be added any color of Diamond dyes which may be desired. I then allow this prepared glass to dry for one or more hours. I paste the back of the article to be enameled to one or more ply paper board cut about two inches larger than the glass used, having previously soaked the board and article to be enameled thirty minutes or more, so that they may be very pliable.

After the prepared glass has become dry I dissolve the following ingredients in about the following proportions, at a temperature of 212° Fahrenheit, viz: gum-arabic, two grains; alcohol, two grains; glutina alba, (white glue,) two ounces; soft water, four ounces. When dissolved, pour into a filtering and pouring vessel. I then place one end of the sheet of paper board into the points of the tool provided for holding the work and glass in the proper place. Now pour the dissolved emulsion over the end of the glass and with a suitable straight-edge work the sheet down onto the surface of the glass and also remove from between the glass and prints the air-bubbles. Now place upon racks to dry with the glass down and in a cold room. When dry, the enamel may be broken from the edges of the glass and the sheet may be cut up, as the occasion may require. If the article is also to be mounted upon cards, (card mounts,) as photographs, it may be done by placing the work in any of the presses adapted for that purpose, first covering the enameled surface with a piece of plate-glass or any plated metal, and thus allow it to remain for about a minute.

Having thus described my invention, what I claim to be new, and desire to secure by Letters Patent, is—

1. An enameling composition consisting of the following ingredients: celloidine, alcohol, and ether, combined in substantially the proportions set forth.

2. An enameling composition consisting of the following ingredients: celloidine, ether, alcohol, and Diamond dyes, in substantially the proportions set forth.

3. The herein-described process of enameling photographs and other prints, consisting of first treating common window-glass with a mixture of talc and alcohol, then flowing the same with a solution of celloidine, ether, and alcohol, with Diamond dyes, in substantially the proportions set forth, then drying the prepared glass for one hour and again applying the following solution: gum-arabic, alcohol, glutina alba, and soft water, then immediately applying the article to be enameled and drawing out the air-bubbles and drying, and then removing the glass from the enameled surface, substantially as set forth.

4. An enameling-emulsion consisting of gum-arabic, alcohol, glutina alba, and soft water, in substantially the proportions set forth.

In testimony whereof I affix my signature in presence of two witnesses.

CHRISTOPHER C. F. BRANDT.

Witnesses:
FRED. HEINZ,
HENRY THUENEN, Jr.